United States Patent
Farmer et al.

(10) Patent No.: US 11,148,118 B2
(45) Date of Patent: *Oct. 19, 2021

(54) ENCAPSULATED FRAGRANCE IN COMPRESSED TABLET

(71) Applicant: W.M. Barr & Company, Inc., Memphis, TN (US)

(72) Inventors: Rachel Ann Farmer, Memphis, TN (US); Dennis Earl Shireman, Marion, AR (US); Charles L. Hawes, Cordova, TN (US); Brett Justin Healey, Memphis, TN (US); Matthew Michael Petkus, Memphis, TN (US)

(73) Assignee: W.M. Barr & Company, Inc., Memphis, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/157,273

(22) Filed: Oct. 11, 2018

(65) Prior Publication Data
US 2019/0111383 A1    Apr. 18, 2019

Related U.S. Application Data

(60) Provisional application No. 62/571,825, filed on Oct. 13, 2017.

(51) Int. Cl.
*B01D 53/28*    (2006.01)
*B01J 20/04*    (2006.01)
(Continued)

(52) U.S. Cl.
CPC .......... *B01J 20/046* (2013.01); *B01D 53/261* (2013.01); *B01D 53/263* (2013.01); *B01J 20/22* (2013.01);
(Continued)

(58) Field of Classification Search
None
See application file for complete search history.

(56) References Cited

U.S. PATENT DOCUMENTS

| 2,951,812 A | 9/1960 | Rapp et al. |
| 3,390,511 A * | 7/1968 | Norton ................... B01D 53/26 |
| | | 95/91 |

(Continued)

FOREIGN PATENT DOCUMENTS

| CN | 200970368 Y | 11/2007 |
| WO | 01/35764 A1 | 5/2001 |

(Continued)

OTHER PUBLICATIONS

International Search Report and Written Opinion of corresponding application PCT/US2018/055538, dated Dec. 14, 2018, all enclosed pages cited.

(Continued)

*Primary Examiner* — Joseph D Anthony
(74) *Attorney, Agent, or Firm* — Nelson Mullins Riley & Scarborough LLP

(57) ABSTRACT

A tablet having a deliquescent desiccant and a fragrance encapsulated on or within a binding agent. The tablet is in a pressed form. A method of making a tablet involves providing a deliquescent desiccant, encapsulating a fragrance by spray drying the fragrance on a carbohydrate, combining the deliquescent desiccant and the carbohydrate encapsulated fragrance, and pressing the combination into the tablet.

18 Claims, 1 Drawing Sheet

(51) Int. Cl.
    *B01J 20/28*     (2006.01)
    *B01D 53/26*     (2006.01)
    *B01J 20/22*     (2006.01)
    *B01J 20/24*     (2006.01)

(52) U.S. Cl.
    CPC ............ *B01J 20/223* (2013.01); *B01J 20/24* (2013.01); *B01J 20/2805* (2013.01); *B01J 20/28016* (2013.01); *B01J 20/28042* (2013.01); *B01D 53/28* (2013.01); *B01D 2251/302* (2013.01); *B01D 2251/306* (2013.01); *B01D 2251/402* (2013.01); *B01D 2251/404* (2013.01); *B01D 2253/112* (2013.01); *B01D 2253/20* (2013.01); *B01D 2253/25* (2013.01); *B01D 2259/4508* (2013.01); *B01D 2259/4525* (2013.01)

(56) References Cited

U.S. PATENT DOCUMENTS

| | | |
|---|---|---|
| 3,549,549 A | 12/1970 | Henderson et al. |
| 4,459,368 A | 7/1984 | Jaffee et al. |
| 5,773,105 A | 6/1998 | Klett |
| 5,907,908 A | 6/1999 | Cunanan et al. |
| 5,917,110 A | 6/1999 | Kust |
| 5,935,304 A | 8/1999 | Shelley et al. |
| 6,217,701 B1 | 4/2001 | Shelley et al. |
| 6,235,219 B1 | 5/2001 | Beckenhauer |
| 6,281,407 B1 | 8/2001 | Warner et al. |
| 6,540,937 B1 | 4/2003 | Payne et al. |
| 6,649,086 B2 | 11/2003 | Payne et al. |
| 6,652,775 B2 | 11/2003 | Payne et al. |
| 6,716,276 B2 | 4/2004 | Loop et al. |
| 6,932,982 B2 | 8/2005 | McIver et al. |
| 7,615,269 B2 | 11/2009 | Payne et al. |
| 7,825,066 B1 | 11/2010 | Skaggs et al. |
| 7,857,896 B2 | 12/2010 | Magargee et al. |
| 8,262,926 B2 | 9/2012 | Kassouni |
| 9,005,351 B2 | 4/2015 | Tornel Garcia |
| 2002/0014305 A1 | 2/2002 | Dick et al. |
| 2002/0026872 A1* | 3/2002 | Smith .................... B01D 53/28 95/117 |
| 2002/0083832 A1* | 7/2002 | Smith .................... B01D 53/28 95/91 |
| 2004/0018278 A1 | 1/2004 | Popplewell et al. |
| 2005/0223584 A1 | 10/2005 | Jones et al. |
| 2006/0016765 A1* | 1/2006 | DiPietro ................ A01N 59/00 210/754 |
| 2006/0018940 A1* | 1/2006 | DiPietro ................ A01N 59/00 424/405 |
| 2008/0207434 A1 | 8/2008 | Martinez et al. |
| 2015/0209712 A1 | 7/2015 | Beckenhauer |
| 2017/0165314 A1* | 6/2017 | Hisatsune .............. A61K 38/05 |
| 2019/0111408 A1* | 4/2019 | Farmer ................. B01D 53/261 |

FOREIGN PATENT DOCUMENTS

| | | |
|---|---|---|
| WO | 02/089862 A2 | 11/2002 |
| WO | 2016/203152 A1 | 12/2016 |
| WO | 2016203150 A1 | 12/2016 |

OTHER PUBLICATIONS

International Search Report and Written Opinion of corresponding application PCT/US2018/055537, dated Jan. 8, 2019, all enclosed pages cited.

Skvortsova, ZN, et al. Recrystallization creep of sodium chloride in solutions with different compositions: 2. The effect of urea additives. Colloid journal. Oct. 1, 2008. vol. 70. No 5; p. 629.

Ebersten, RB. Effect of Sugar as an Additive on the Longevity of Salt on Pavements. Master's thesis. NTNU, 2015; p. 31 [online], [retrieved on Nov. 18, 2018]. Retrieved from the Internet <URL: https://brage.bibsys.no/xmlul/bistream/handle/11250/2349760/13096_FULLTEXT.pdf?sequence=1>.

International Preliminary Report on Patentability of corresponding application PCT/US2018/055538, dated Apr. 23, 2020, all enclosed pages cited.

International Preliminary Report on Patentability of corresponding application PCT/US2018/055537, dated Apr. 23, 2020, all enclosed pages cited.

https://web.archive.org/web/20110202050824/https://www.ecompressedair.com/desiccant/deliquescent-tablets.aspx (Year: 2011).

Supplementary European Search Report, European U.S. Appl. No. 18/865,820, dated Jun. 8, 2021, 2 pages.

Supplementary European Search Report, European U.S. Appl. No. 18/867,284, dated Aug. 12, 2021, 3 pages.

* cited by examiner

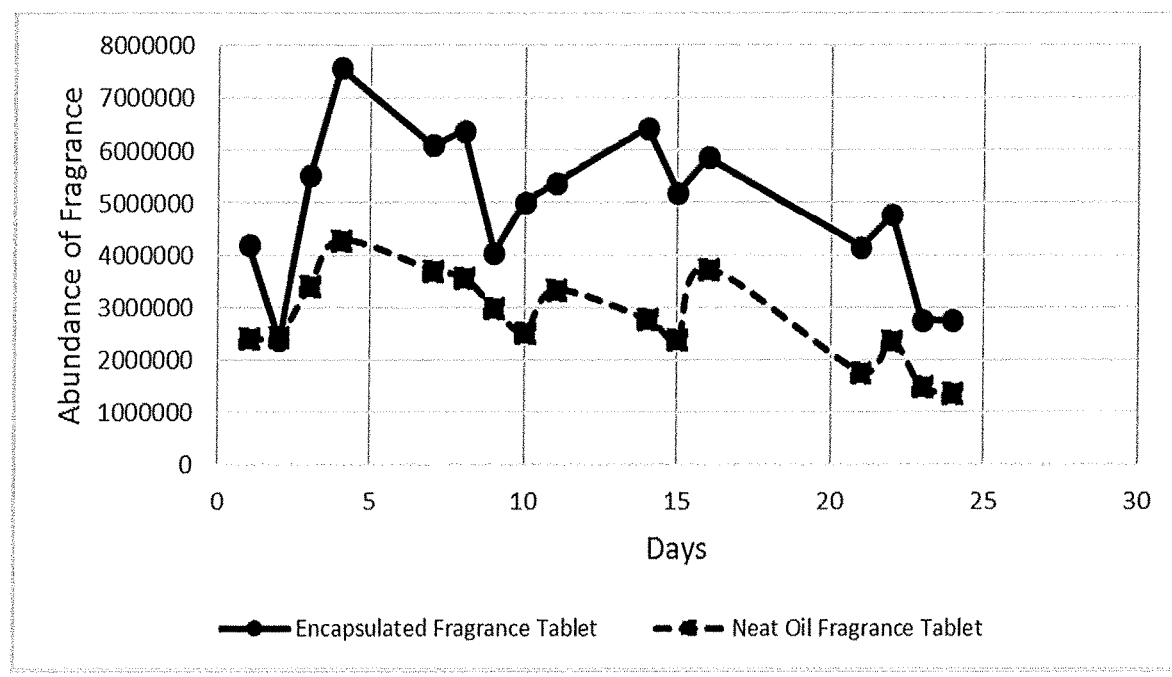

ENCAPSULATED FRAGRANCE IN COMPRESSED TABLET

CROSS-REFERENCE TO RELATED APPLICATIONS

This application claims priority from U.S. provisional patent application No. 62/571,825, filed on Oct. 13, 2017, in the United States Patent and Trademark Office. The disclosure of which is incorporated herein by reference in its entirety.

FIELD OF THE INVENTION

The present invention relates to fragrance release dehumidifying products, more particularly to an encapsulated fragrance in compressed tablet form.

BACKGROUND OF THE INVENTION

Atmospheric water vapor in high humidity environments can be problematic to personal articles, clothing for example, and other items which are susceptible to corrosion, mold, mildew, and other types of water related damage and deterioration. Many consumers use dehumidifying devices to protect their property from moisture and combat mildew odors. For this reason, consumers are looking for products that work to remove moisture from the air and mask any mildew odors with a consistent release of fragrance.

One way to include fragrance in dehumidifying devices is by the addition of polyethylene glycol (PEG) beads infused with fragrance oil. One example of a dehumidifying device is a deliquescent desiccant such as $CaCl_2$ in granular, pellet, or flake form combined with PEG beads. This fragrance delivery method gives the consumer an initial burst of fragrance during the beginning of the products life, but the fragrance quickly fades away as the product works and is not consistent throughout the lifetime of the product. Another problem with PEG beads is that they do not dissolve. They are left behind in the product after the $CaCl_2$ has all turned into a liquid solution after absorbing moisture from the air. This poses a problem for disposal of the PEG beads because if they are flushed into the water systems they may accumulate in the environment. Thus, there is a need for a new fragrance technology that will allow for a longer, more consistent duration of fragrance throughout the life of the product, and a fragrance system that will be disposable and environmentally friendly.

SUMMARY OF THE INVENTION

The present invention relates to an encapsulated fragrance in compressed tablet form.

In an embodiment of the invention, a tablet is provided. The tablet comprises a deliquescent desiccant and a fragrance encapsulated on or within a binding agent. The tablet is in a pressed form.

In an embodiment of the invention, a method of making the tablet is provided. The method comprises providing a deliquescent desiccant, encapsulating a fragrance by spray drying the fragrance on a carbohydrate, combining the deliquescent desiccant and the carbohydrate encapsulated fragrance, and pressing the combination into the tablet.

In an embodiment of the invention, a method of making the tablet is provided. The method comprises combining granular flake or powder calcium chloride with a carbohydrate encapsulated fragrance powder, mixing, placing the mixture into a tablet mold, and pressing into the tablet.

In an embodiment of the invention, a dehumidifying device is provided. The dehumidifying device comprises a tablet comprised of a deliquescent desiccant, and a fragrance encapsulated on or within a binding agent. The tablet is in a pressed form.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 1 is a graph comparing the abundance of fragrance in a tablet containing starch encapsulated fragrance vs. a tablet containing fragrance oil in which the data was compiled used Solid Phase MicroExtraction (SPME).

DESCRIPTION OF THE PREFERRED EMBODIMENTS

The following description of the embodiments of the present invention is merely exemplary in nature and is in no way intended to limit the invention, its application, or uses. The present invention has broad potential application and utility, which is contemplated to be adaptable across a wide range of uses and industries. The following description is provided herein solely by way of example for purposes of providing an enabling disclosure of the invention, but does not limit the scope or substance of the invention.

In an embodiment of the invention, a tablet comprises a deliquescent desiccant, preferably $CaCl_2$, and an encapsulated fragrance. The encapsulated fragrance releases bursts of fragrance when exposed to humidity or moisture. Incorporating encapsulated fragrance into a compressed tablet having a deliquescent desiccant, allows the fragrance to be released as the deliquescent desiccant absorbs moisture from the environment. As the outer surface of the tablet is exposed to environmental humidity or moisture, it releases bursts of fragrance. As the outer layer begins to dissolve the surface underneath becomes exposed and then is allowed to release its fragrance. This allows fragrance to be released in a consistent profile over the lifetime of the tablet as moisture becomes available. If the encapsulated fragrance is mixed with a deliquescent desiccant, preferably $CaCl_2$, in a non-tableted form the fragrance has a less consistent release profile where fragrance is flashed off in a shorter time period. The encapsulated fragrance will react and be released in a shorter window of time when first exposed to humidity or moisture. This is because it is not embedded and protected within layers as it would be in a tablet form.

In an embodiment of the invention, a tablet having a deliquescent desiccant comprises a fragrance that is encapsulated on or within a binding agent, preferably a carbohydrate. Preferably, the fragrance is encapsulated on the carbohydrate through a spray drying process. Non-limiting examples of a deliquescent desiccant include, but are not limited to, calcium chloride ($CaCl_2$), magnesium chloride, potassium chloride, lithium chloride, and a combination thereof. Non-limiting examples of a carbohydrate include, but are not limited to, starch, modified starch, cyclodextrin, amylopectin, amylase, other carbohydrates, and combinations thereof. The tablet may also optionally comprise one or more components such as urea, magnesium stearate, dye, polyethylene glycol (PEG), silicate, and carbonate.

A deliquescent desiccant may be present in the tablet in a weight percentage of 50% to about 100%.

A fragrance that is encapsulated through a spray drying process onto a carbohydrate may be referred to interchangeably herein as "carbohydrate encapsulated fragrance," "starch encapsulated fragrance," or an "encapsulated fragrance." The carbohydrate encapsulated fragrance may be loaded with fragrance oil ranging from 10% to 60% by weight oil. The carbohydrate encapsulated fragrance may be present in the tablet in a weight percentage of up to 40 weight %. For example, a small tablet weighs from 1 gram to 150 grams and may contain carbohydrate encapsulated fragrance in an amount from 1% to 40% by weight of the tablet. For example, a large tablet weighs from 150 grams to 1000 grams and may contain carbohydrate encapsulated fragrance in an amount from 1% to 20% by weight of the tablet.

In an embodiment of the invention, the fragrance oil can be sprayed on or into the deliquescent desiccant (which is in a form of a heterogeneous mixture before the mixture is pressed into a tablet), the fragrance can be encapsulated with a carbohydrate and then mixed with the deliquescent desiccant, or the fragrance can be added by a combination of these methods.

In an embodiment of the invention, the carbohydrate is starch. Starch encapsulated fragrance releases fragrance molecules when exposed to water. Incorporating starch encapsulated fragrance into a pressed tablet having a deliquescent desiccant allows the fragrance to be released more consistently over the lifetime of the tablet. This is mainly due to the exposed surface area of the tablet reacting with the humidity in the atmosphere, releasing the fragrance from the starch in the exposed surface and exposing unreacted starch encapsulated fragrance in a new surface. If fragrance is mixed with flaked, pelleted, powder, or granular deliquescent desiccant such as calcium chloride, and not pressed into a tablet, the fragrance will be released in a less consistent manner than if it were pressed into a tablet having a deliquescent desiccant. This is because the fragrance is not embedded and protected within layers as in a pressed tablet. Thus, pressed tablets comprising a deliquescent desiccant, preferably calcium chloride, and an encapsulated fragrance are provided in accordance with the present invention.

In an embodiment of the invention, a pressed tablet(s) that comprises calcium chloride and starch encapsulated fragrance can be combined with a granular, pelleted, powder, or flaked calcium chloride heterogeneous mixture. Alternatively, the pressed calcium chloride tablet(s) containing starch encapsulated fragrance may be shattered into smaller pieces of pressed material and included in such a mixture. This composition and method would allow for longer, more consistent lasting fragrance profile and complete dissolution of the tablet, as opposed to PEG fragrance beads since PEG beads do not dissolve or provide consistent fragrance release.

As an example, small tablets can be mixed in with flaked, pelleted, powder, or granular deliquescent material in accordance with the present invention.

The terms "small" and "smaller" and "large" and "larger" are relative terms to one another. The actual dimensions and weight of such tablets may vary but still be within the scope of the present invention. For example, a small tablet may weigh from 1 gram to 150 grams, and a large tablet may weigh from 150 grams to 1000 grams.

A dehumidifying device may comprise the tablet of the present invention. The tablet may be used alone or in a mixture with other components.

Pressed $CaCl_2$ tablets comprising encapsulated fragrance may be used instead of or in combination with the fragrance and/or fragrance beads.

In an embodiment of the invention, a method of making a tablet in accordance with the present invention is provided. The method comprises providing a deliquescent desiccant, encapsulating a fragrance by spray drying the fragrance on a carbohydrate, combining the deliquescent desiccant and the carbohydrate encapsulated fragrance, and pressing the combination into the tablet.

A preferred method of making the tablet is as follows. The method comprises combining a mixture of granular flake or powder $CaCl_2$ with encapsulated carbohydrate fragrance powder into a ribbon blender and mixing thoroughly, placing the mixture into a tablet mold, and pressing into a tablet using mechanical equipment or other techniques.

In an embodiment of the invention, a tablet is provided such as for use in a dehumidifying device to remove moisture from the air.

In an embodiment of the invention, tablets can be used in a heterogeneous mixture with $CaCl_2$ to replace PEG beads for consistent fragrance experience for consumers and to provide a more environmentally friendly product.

The tablet and methods of the present invention are advantageous because they provide a more consistent fragrance profile over the life span of deliquescent desiccant consumer goods. The tablet and method of the present invention works synergistically with $CaCl_2$ to produce fragrance as the tablet is being consumed instead of flashing off the fragrance within the first few days of product use. Since the starch encapsulated fragrance is in tablet form, the fragrance is released consistently throughout the life of the product because of new surface area being exposed as the $CaCl_2$ absorbs moisture. As the tablet is used up, there is nothing left behind except for captured moisture, preferably collected within another compartment of a dehumidifying product. This is more environmentally friendly and makes it easier for the consumer to reuse/refill dehumidifying products after the tablet has been consumed. Another advantage in making a tablet with encapsulated fragrance is the ability to deliver higher dosages of fragrance. When using fragrance oil or sprayable fragrance in a tablet desiccant application, there are issues with caking up of the dry powder in production. Lower levels of fragrance oil can be used to form a tablet than is customary. However, with the use of encapsulated fragrance as the source of fragrance, success has been seen in making a tablet possessing fragrance levels greater than the 20% delivered fragrance range.

COMPARATIVE EXAMPLE

Encapsulated starch used in a tablet having a deliquescent desiccant was compared against flake $CaCl_2$ mixed with PEG beads (referred to herein as the fragrance delivery method). An experiment was conducted where the tablet form of the $CaCl_2$ deliquescent desiccant containing the starch encapsulated fragrance was placed in a medium sized closet. In another similar sized closet, flake $CaCl_2$ mixed with PEG beads was placed. The strength of the fragrance within the room was reported. The room containing the encapsulated fragrance was reported smelling nicer for more days than the room containing flake $CaCl_2$ mixed with PEG beads.

Example 2

Solid Phase MicroExtraction (SPME) is an extraction technique for organic compounds. Analytes are adsorbed directly from the sample onto a fused-silica fiber that is coated with an appropriate stationary phase. While the fiber is inserted in the sample space, the analytes partition from the sample matrix into the stationary phase until equilibrium is reached. The fiber is then inserted into the injector port of a gas chromatograph (GC) where it is heated, and the analytes are rapidly thermally desorbed into a capillary GC column for analysis. Using SPME, analysis of the abundance of fragrance over a period can be determined and used to compare different delivery systems for fragrance.

An experiment was conducted in which a large, 450 gram tablet that contained encapsulated fragrance and calcium chloride was placed in a fragrance chamber with the volume of 11.5 $ft^3$. In a different chamber, a 450 g tablet containing the same ratio of fragrance to calcium chloride was placed. However, this fragrance was strictly neat fragrance oil not encapsulated with starch. These chambers were placed in ambient conditions within an office building during summer months. Injections were made using the SPME techniques to analyze the fragrance particles within the chamber over a period of time. The head space of each chamber was sampled daily using Solid Phase Micro Extraction (SPME) techniques and then injected into a Gas Chromatograph Electron Ionization Detector with a Mass Spectrometer (GCMS) (Hewlett Packard G1800C GCD System Series II) to quantify the abundance of fragrance molecules present.

A Carboxen®/Polydimethylsiloxane (PDMS) SPME fiber was used for the fragrance analysis. The SPME fiber was injected into the 11.5 $ft^3$ fragrance chamber and allowed to absorb fragrance molecules in the head space of the chamber for 30 minutes. The fiber was then manually injected into the GCMS. The test method used for SPME analysis on GCMS began with an initial oven temperature of 40 C for 3 minutes. The temperature ramp was set at 20 C/min till it reached a final temperature of 280 C where it held for 2 minutes.

The area of the peaks that was detected on the GCMS was summed to get the "total" abundance of fragrance detected within the chamber. This is represented by the abundance of fragrance on the y-axis on the graph shown in FIG. 1. The data was then plotted and the results were as follows.

As seen in FIG. 1, the abundance of fragrance was greater over a period of time for the tablet that contained starch encapsulated fragrance. From the results, it was theorized that the humidity caused the $CaCl_2$ to absorb moisture from the environment which caused the starch encapsulated fragrance to release fragrance particles. Since the encapsulated fragrance was compressed into a tablet, the fragrance experience at the higher abundance level was seen over a longer period of time. It was theorized that as the $CaCl_2$ absorbed moisture, the outer surface released fragrance molecules and then was degenerated into brine.

The tablet containing only neat oil fragrance did not have the fragrance bound to a carbohydrate molecule that synergistically worked together with moisture drawn in from the air of the room to release itself overtime. The neat fragrance oil tablet rather just permeated fragrance over time and gradually decreased in intensity rather than providing stronger "bursts" of fragrance as moisture was drawn into the tablet.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A tablet comprising:
   a deliquescent desiccant, and
   a fragrance encapsulated on or within a binding agent and the binding agent is a carbohydrate,
   wherein the tablet is in a pressed form.

2. The tablet according to claim 1, wherein the deliquescent desiccant is selected from the group consisting of calcium chloride, magnesium chloride, potassium chloride, lithium chloride, and a combination thereof.

3. The tablet according to claim 1, wherein the carbohydrate is selected from the group consisting of starch, modified starch, cyclodextrin, amylopectin, amylase, and a combination thereof.

4. The tablet according to claim 1, further comprising a component selected from the group consisting of urea, magnesium stearate, dye, polyethylene glycol (PEG), silicate, carbonate, and a combination thereof.

5. The tablet according to claim 1, wherein the deliquescent desiccant has a weight percentage in a range of 50% to about 100%.

6. The tablet according to claim 1, wherein the fragrance is encapsulated by spray drying.

7. The tablet according to claim 1, wherein the carbohydrate encapsulated fragrance is loaded with fragrance oil in an amount ranging from 10% to 60% by weight neat oil.

8. The tablet according to claim 1, wherein the carbohydrate encapsulated fragrance is present in the tablet in an amount of up to 40 weight %, based on the weight of the tablet.

9. The tablet according to claim 1, wherein the tablet has a weight of 1 gram to 150 grams.

10. The tablet according to claim 9, wherein the carbohydrate encapsulated fragrance is present in the tablet in an amount of from 1% to 40% by weight of the tablet.

11. The tablet according to claim 1, wherein the tablet has a weight of 150 grams to 1000 grams.

12. The tablet according to claim 11, wherein the carbohydrate encapsulated fragrance is present in the tablet in an amount of from 1% to 20% by weight of the tablet.

13. A tablet comprising:
   a deliquescent desiccant, and
   a fragrance encapsulated on or within a binding agent and the binding agent is a carbohydrate,
   wherein the tablet is in a pressed form and the tablet is combined with a granular, pelleted, powder, or flaked heterogeneous mixture and the heterogeneous mixture comprises calcium chloride.

14. A method of making a tablet, the method comprising:
providing a deliquescent desiccant,
encapsulating a fragrance by spray drying the fragrance on or within a [carbohydrate,] carbohydrate binding agent, combining the deliquescent desiccant and the carbohydrate encapsulated fragrance, and
pressing the combination into the tablet.

15. The method according to claim 14, further comprising shattering the tablet into pieces.

16. The method according to claim 14, wherein the deliquescent desiccant is selected from the group consisting of calcium chloride, magnesium chloride, potassium chloride, lithium chloride, and a combination thereof.

17. A dehumidifying device comprising:
a tablet comprised of:
  a deliquescent desiccant, and
  a fragrance encapsulated on or within a binding agent and the binding agent is a carbohydrate,
  wherein the tablet is in a pressed form.

18. A dehumidifying device comprising:
a mixture of:
  a tablet comprised of a deliquescent desiccant, and a fragrance encapsulated on or within a binding agent and the binding agent is a carbohydrate,
  wherein the tablet is in a pressed form and is combined with a granular, pelleted, powder, or flaked heterogeneous mixture and the heterogeneous mixture comprises calcium chloride.

\* \* \* \* \*